United States Patent
Skvarla et al.

(10) Patent No.: US 6,733,396 B2
(45) Date of Patent: May 11, 2004

(54) CONSTANT VELOCITY JOINT

(75) Inventors: William Paul Skvarla, Saginaw, MI (US); Steven Mark Thomas, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 97 days.

(21) Appl. No.: 10/104,542

(22) Filed: Mar. 22, 2002

(65) Prior Publication Data

US 2003/0181244 A1 Sep. 25, 2003

(51) Int. Cl.$^7$ ................................................ F16D 3/224
(52) U.S. Cl. ........................................ 464/145; 464/178
(58) Field of Search ............................... 464/145, 143, 464/178, 906; 301/105.1; 384/544

(56) References Cited

U.S. PATENT DOCUMENTS

| | | |
|---|---|---|
| 2,182,455 A | 12/1939 | Smith |
| 4,372,628 A | 2/1983 | Kiener et al. |
| 4,421,197 A | 12/1983 | Chandioux |
| 4,529,254 A * | 7/1985 | Krude .................. 464/178 |
| 4,591,212 A * | 5/1986 | Balken et al. .......... 301/105.1 |
| 4,629,028 A * | 12/1986 | Krude et al. ............ 180/259 |
| 4,880,281 A | 11/1989 | Merkelbach |
| 5,201,107 A | 4/1993 | Mazziotti |
| 5,494,129 A * | 2/1996 | Krude et al. ............. 180/256 |
| 6,159,103 A | 12/2000 | Lu |
| 6,186,899 B1 | 2/2001 | Thomas et al. |
| 6,190,260 B1 | 2/2001 | Flores et al. |
| 6,206,785 B1 | 3/2001 | Thomas |
| 6,390,925 B1 | 5/2002 | Perrow |
| 6,443,844 B1 | 9/2002 | Perrow |
| 6,468,164 B2 | 10/2002 | Song |
| 6,533,668 B2 | 3/2003 | Mizukoshi et al. |
| 6,582,313 B2 | 6/2003 | Perrow |
| 6,616,537 B2 | 9/2003 | Thomas et al. |
| 6,616,538 B2 | 9/2003 | Perrow |

* cited by examiner

*Primary Examiner*—Lynne H. Browne
*Assistant Examiner*—Aaron Dunwoody
(74) *Attorney, Agent, or Firm*—Michael D. Smith

(57) ABSTRACT

A constant velocity joint includes a rotatable wheel hub for mounting a wheel of a vehicle which serves as the outer race of the joint. The hub is formed with a through bore that includes a part spherical surface at an inboard end of the hub. An inner joint is installed through the open outboard end and is formed with a plurality of ball grooves whose centers are offset with respect to the center of the joint, forcing balls within the grooves toward the installation end of the hub. A ball retainer device is disposed in the wheel hub bore to retain the balls and seal the joint.

8 Claims, 2 Drawing Sheets

US 6,733,396 B2

CONSTANT VELOCITY JOINT

BACKGROUND OF THE INVENTION

1. Technical Field

Figure 1:
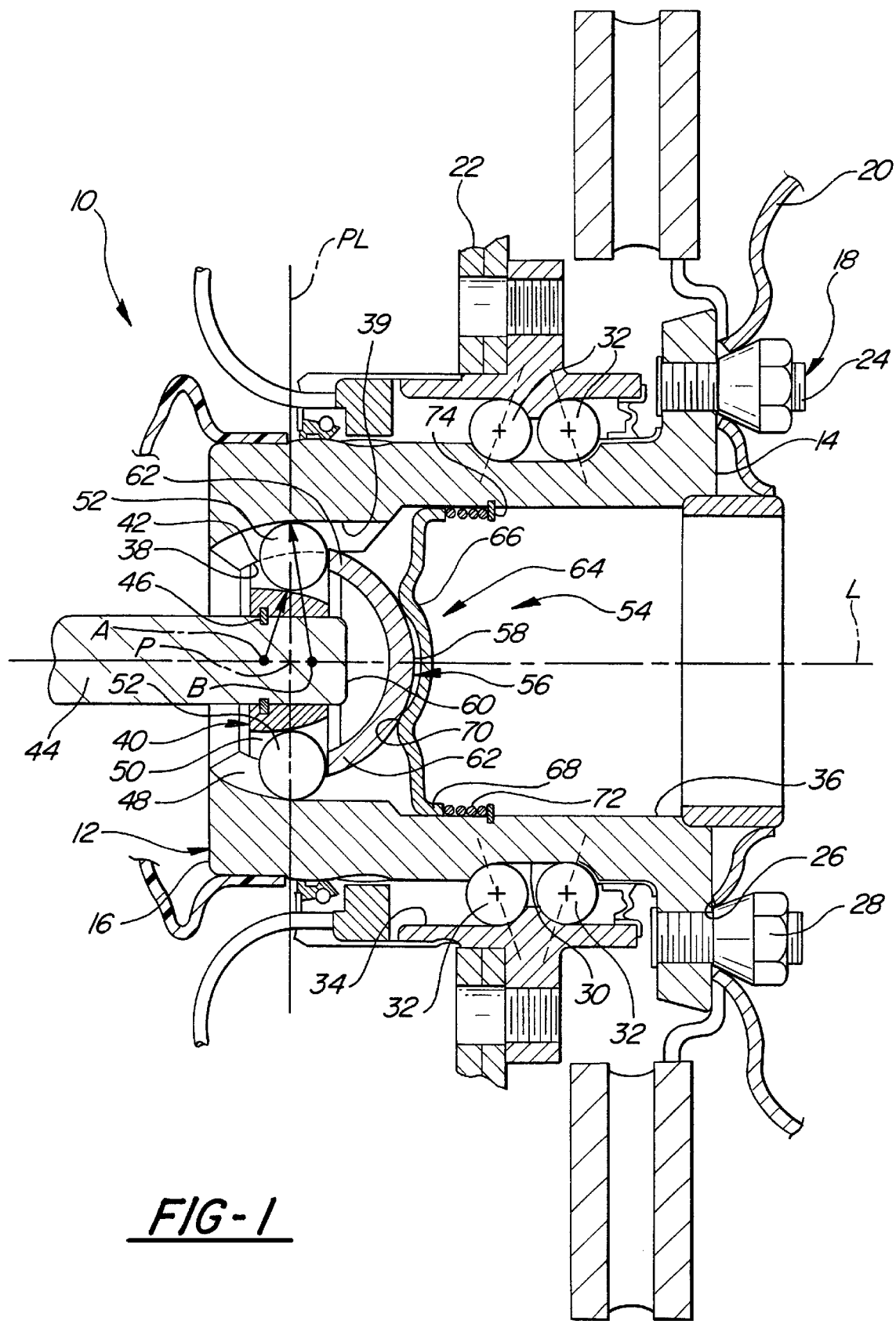

This invention relates generally to constant velocity joints and more particularly to those integrated with a wheel hub used for mounting a rotatable wheel of a vehicle.

2. Related Art

It has been proposed in the prior art to integrate a constant velocity joint of a wheel end assembly with the wheel hub of a vehicle, in which case the wheel hub serves as the outer race of the joint. Examples include U.S. Pat. Nos. 4,372,628; 4,421,197; and 4,880,281. In each case, the inner race is installed within the inboard end of the wheel hub opposite the flanged end on which the wheel is mounted, and the torque-transmitting balls disposed in the aligned grooves between the wheel hub and inner race are maintained in a common plane by an intervening ball cage between the inner race and hub. Such assemblies present a rather complex joint configuration that is costly to manufacture and difficult to assemble.

A constant velocity joint constructed according to the present invention simplifies the construction and assembly of such integrated wheel joint assemblies.

SUMMARY OF THE INVENTION AND ADVANTAGES

A constant velocity joint for a vehicle according to one aspect of the invention comprises a wheel hub which serves as an outer race of the joint which is equipped with wheel mounting structure adjacent a first of its ends that is configured to mount a wheel of a vehicle. The wheel hub has an outer circumferentially extending bearing surface configured to support bearing balls for rotation of the wheel hub about its longitudinal axis relative to support structure of the vehicle. The wheel hub has a longitudinal bore disposed about the axis and including a part spherical surface adjacent an opposite second end of the wheel hub. An inner race is disposed within the bore of the wheel hub and has a part spherical outer surface directly engaging the part spherical surface of the bore and defining a joint center point of the joint about which the wheel hub articulates relative to the inner race. The part spherical surface of the bore extends toward the first end of the wheel hub no further than a plane perpendicular to the longitudinal axis of the bore containing the center point of the joint. The wheel hub and inner race include a plurality of axially extending aligned ball grooves and a torque-transmitting ball in each of the grooves for transmitting torque while permitting relative articulation between the wheel hub and inner race. The grooves of the wheel hub have an associated groove center which is offset axially from the center point on one axial side thereof, and the grooves of the inner race have an associated groove center which is offset axially from the center point on the opposite axial side thereof, such that the balls are forced axially underload toward the first end of the wheel hub. The joint includes the ball retainer device which is disposed within the bore between the balls and first end of the wheel hub which applies a constant bias load to the balls toward the second end maintaining the balls within the grooves in a common ball plane during articulation of the joint.

The invention has the advantage of simplifying the construction and assembly of constant velocity joints integrated with the wheel hub of a vehicle.

The simplified construction includes the direct engagement of the part spherical outer surface of the inner race with the part spherical wall surface of the bore eliminates the intervening ball cage associated with the known prior art constructions.

The provision of the internal ball retainer device in lieu of the normal ball cage reduces the radial size of the joint as compared to known prior art devices and facilitates the assembly of the inner components through the outboard first end of the wheel hub, rather than having to manipulate the various components for installation through the inboard second end as with the known prior art.

According to further aspect of the invention, such a joint is easily assembled by simply installing the inner race and balls within the second end, where the part spherical surfaces engage and the balls are disposed in the ball grooves between the inner race and wheel hub, after which a ball retainer device is installed in the second end to retain the inner race and balls within the wheel hub. This simplified assembly process may be performed by hand or partially or fully automated, thereby simplifying the manufacturing process and reducing the cost of making such integrated wheel joint assemblies.

THE DRAWINGS

Figure 2:
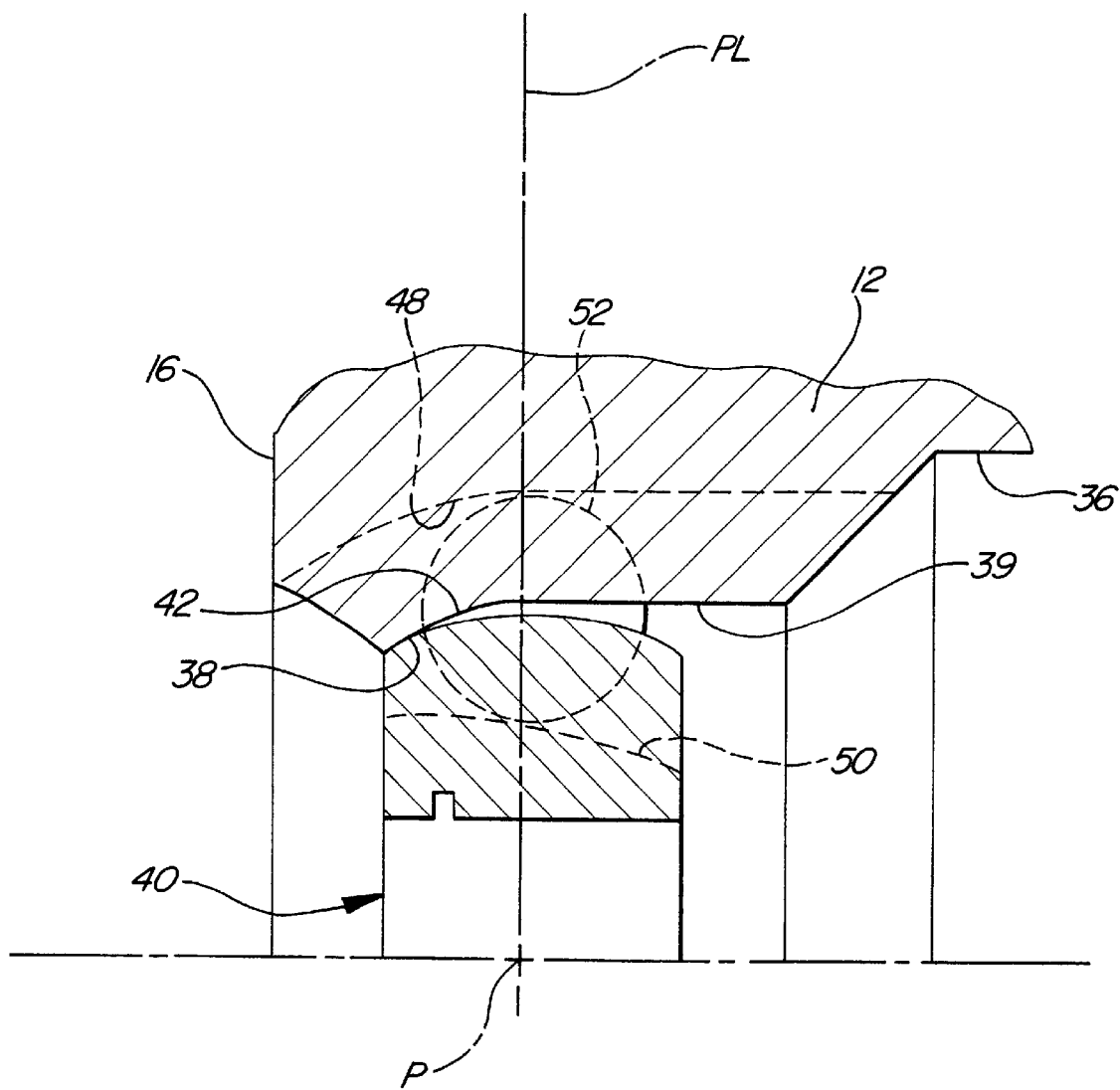

These and other features and advantages of the present invention will become more readily appreciated when considered in connection with the following detailed description and appended drawings, wherein:

FIG. 1 is a fragmentary sectional view of a wheel joint assembly constructed according to a presently preferred embodiment of the invention; and FIG. 2 is an enlarged, fragmentary sectional view showing a portion of the joint.

DETAILED DESCRIPTION

A constant velocity joint constructed according to a presently preferred embodiment of the invention is shown generally at 10 in FIG. 1 and comprises a wheel hub 12 extending along a longitudinal axis L between a first outboard end 14 and a second inboard end 16. The wheel hub 12 has wheel mounting structure 18 adjacent the outboard end 14 which is configured, preferably in the form of a flange, to accommodate the mounting of a vehicle wheel 20 for rotation with the wheel hub 12 relative to support structure 22 of the vehicle.

As illustrated, the wheel mounting structure 18 may include threaded wheel studs 24 arranged in a pattern matching a pattern of openings 26 in the wheel 20 for piloting the wheel 20 onto the studs 24 after which they may be secured in the usual manner by lug nuts 28, or the like. It will be appreciated that the manner by which the wheel mounts to the hub 12 may be practiced in any of a number of ways which will not affect the operation of the invention. Accordingly, any mounting system which results in the wheel 20 being secured to the wheel hub 12 is contemplated within the scope of the invention and incorporated herein by reference.

The wheel hub 12 is formed with a circumferentially extending outer bearing surface 30 which is configured to support bearing balls 32 which act between it and an associated outer bearing surface 34 of the support structure 22 for supporting the wheel hub 12 for rotation relative to the stationary support structure 22, such as the chassis of the vehicle. In other words, the wheel hub 12 and thus the wheel 20, is supported for rotation about the longitudinal axis L preferably, but not necessarily, by means of the bearing balls supported by the bearing surface of the wheel hub and surrounding stationary support structure of the vehicle. Other rotational support which cooperates with the bearing surface 30 of the wheel hub 12 for supporting the wheel hub 12 for rotation about its axis L is contemplated within the scope of the invention and incorporated herein by reference.

The wheel hub 12 is formed with a central bore 36 which preferably extends completely through the wheel hub 12 between the first end 14 and opposite second end 16. The size of the opening of the bore 36 at the first end 14 is preferably larger than the size of the opening of the bore 36 at the second end 16. The bore 36 at the second end 16 is formed with a part spherical engaging surface 38 which extends from the second end 16 toward the first end 14 in a widening fashion, such that the surface 38 is smallest in diameter at the second end 16 and widens axially toward the first end 14.

An inner race 40 of the joint 10 is disposed within the bore 36 of the wheel hub 12 and has a part spherical surface 42 which is disposed in direct, contacting engagement with the part spherical surface 38 of the wheel hub 12. When so engaged, the surfaces 38,42 of the wheel hub 12 and inner race 40 define a center point P of the joint 10 about which the wheel hub 12 can articulate or angulate in all directions relative to the inner race 40. The inner race 40 is fixed on a shaft 44 which extends from the inner race 40 outwardly of the hub 12 through its second end 16. The shaft 44 may be formed as one piece with the inner race 40, or formed separately from the race 40 and joined thereto such as by a splined connection and retainer ring 46, as schematically shown in FIG. 1.

It will be apparent from FIG. 2 that there is direct contact between the inner race 40 and wheel hub 12 via engagement of their part spherical surfaces 42,38, respectively. It will be seen also that the part spherical surface 38 of the wheel hub 12 extends toward the first end 14 no further than a center plane PL drawn perpendicular to the axis L of the wheel hub 12 passing through the center point P of the joint 10. Beyond the plane PL toward the first end 14, the part spherical surface 38 transitions into a substantially cylindrical surface portion 39 which is equal in diameter to the largest dimension of the past spherical surface 38 of the center plane PL. As will be apparent below, this arrangement of the surfaces facilitates simple manufacture and assembly of the components of the joint 10. Accordingly, the diameter of the bore 36 between the plane PL and the first end 14 is no smaller than the diameter of the bore 36 in the plane PL.

The wheel hub 12 and inner race 40 are formed with a plurality of circumferentially spaced, radially aligned, axially extending ball grooves 48,50 in each aligned pair of which is disposed a torque-transmitting ball 52. The ball grooves 50 of the inner race 40 have a convex curvature with an associated ball groove center point A which is offset axially from the joint center point P along the axis L by a fixed distance, and the ball grooves 48 of the wheel hub 12 are concavely curved and have an associated groove center B which is offset from the joint center point P on the opposite axial side as that of the inner race groove center A so as to maintain constant velocity of the joint through all joint angles. This offset arrangement of the ball grooves 48,50 has the further effect of forcing the balls underload axially toward the first end 14 of the wheel hub 12, and thus out of retained capture by the ball groove sets 48,50. This offset arrangement coupled with the part spherical surface 38 of the wheel hub 12 at the second end 16 precludes the inner race 40 and balls 52 from escaping the confines of the wheel hub 12 to the second end 16.

The balls 52 are held in their grooves 48,50 by means of a ball retainer device 54 disposed within the bore 36 of the wheel hub 12 between the balls 52 and the first end 14. The ball retainer device 54 acts to apply a constant bias load to the balls toward the second end 16 so as to maintain the balls 52 within the grooves in a common ball plane (coincident with PL at zero joint angle as shown in FIG. 1). The ball retainer device 54 is installable into the bore 36 through the first end 14, as is the inner race 40 and balls 52. The ball retainer device 54 preferably includes a ball keeper or partial cage 56 having preferably a generally dome-shaped configuration with a convex and preferably part spherical shaped outer bearing surface 58 spaced axially outwardly of the inner race 40 and terminal end 60 of the inner race shaft 44, and includes a plurality (at least 3 and preferably 6) ball-engaging portions or fingers 62 which extend into the ball grooves 48,50 of the wheel hub 12 and inner race 40 and engage each of the balls 52 (which are at least 3 and preferably 6 in number). It will be appreciated that any number of balls equal to 3 or greater could be utilized according to the present invention and are contemplated herein.

The ball retainer device 54 further includes a spring retainer 64 which is formed separately from the ball keeper 56 and acts on the ball keeper 56 to urge it constantly into engagement with the balls 52 during all angles of the joint. The spring retainer 64 preferably includes a plug 66 disposed within the bore 36 of the wheel hub 12 between the ball keeper 56 and the first end 14. The plug 66 has a radially outer wall or flange 68 which conforms closely to the wall of the bore 36 and further is preferably solid across its expanse so as to close off the bore 36 on the first end side 14 of the wheel hub 12 for retaining grease or other lubricant within the joint 10. The plug 66 is formed with a seat 70 which engages the outer bearing surface 58 of the ball keeper 56. The plug 66 is urged by a compression spring 72, or the like, acting between the flange 68 and a retainer ring or other structure of the wheel hub 12, to constantly bias the plug 66 axially toward the ball keeper 56, which in turn forces the ball keeper 56 into constant contact with the balls 52. As the joint 10 angulates and the balls 52 are caused to move in their ball grooves 48,50, the ball keeper 56 moves with the changing angle of the ball plane PL by means of articulated support between the outer bearing surface 58 and the seat 70, preferably about a center point common with the center point P of the joint center. In this way, the balls are able to roll in their grooves 48,50 to accommodate joint angulation, while remaining within their grooves against the constant ejecting force caused by the offset groove centers which is counteracted by the opposing retaining force of the ball retaining device 54.

To manufacture and assemble such a joint, the wheel hub 12 is formed as described with the central open bore 36 having the part spherical surface 38 adjacent the second end 16 which does not pass beyond the center point P. The inner race 40 is installed in the open first end 14 and moved toward the second end 16, bringing the complimenting part spherical surfaces 42,38, respectively, into direct supporting contact to establish the center point P. The balls 52 are loaded into their respective aligned ball grooves 48, 50 through the open first end 14 with the inner race 40 at zero joint angle by simply dropping them into place. The ball retainer device 54 is then installed through the first end by first dropping the ball keeper 56 into place against the balls 52 and then installing and retaining the plug 66 by means of the spring 72 and retainer 74. The second end 16 of the hub 12 may be sealed by a conventional boot seal or the like.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A constant velocity joint for a vehicle, comprising:

a wheel hub serving as an outer race of said joint, said wheel hub having wheel mounting structure adjacent a first end of said wheel hub configured to mount a wheel of the vehicle and having an axially opposite second end spaced from said first end about a longitudinal axis of said wheel hub: said wheel hub having an outer circumferentially extending bearing surface configured to support said wheel hub for rotation about said longitudinal axis relative to support structure of said vehicle;

said wheel hub having a longitudinal bore disposed about said longitudinal axis, said bore including a part spherical surface adjacent said second end;

an inner race disposed within said bore of said wheel hub, said inner race having a part spherical outer surface directly engaging said part spherical surface of said bore and defining a center point of said joint about which said wheel hub articulates relative to said inner race;

said part spherical surface of said bore extending toward said first end of said wheel hub no further than a plane perpendicular to said longitudinal axis of said bore containing said center point of said joint;

said wheel hub and inner race including a plurality of axially extending aligned ball grooves and a torque-transmitting ball in each of said ball grooves for transmitting torque while permitting relative articulation between said wheel hub and said inner race, said grooves of said wheel hub having an associated groove center offset axially from said center point on one axial side thereof and said grooves of said inner race having an associated groove center offset axially from said center point on the opposite axial side thereof such that said balls are forced axially underload toward said first end of said wheel hub;

a ball retainer device disposed within said bore of said wheel hub between said balls and said first end of said wheel hub, said ball retainer device applying a constant bias load to said balls toward said second end maintaining end balls within said grooves in a common ball plane during articulation of said joint;

said ball retainer device includes a ball keeper disposed in said bore of said wheel hub; and a spring retainer disposed in said bore and acting between said wheel hub and said ball keeper to urge said ball keeper constantly axially toward said second end into constant engagement with said balls to maintain said balls within said ball grooves in said common ball plane during said articulation of said joint.

2. The joint of claim 1 wherein said ball retainer device is installable into said bore of said wheel hub through said first end thereof.

3. The joint of claim 2 wherein said bore of said wheel hub is open to said first end.

4. The joint of claim 3 wherein said inner race is installable in said bore through said first end of said wheel hub.

5. The joint of claim 1 wherein said spring retainer includes a plug slideably disposed in said bore of said wheel hub adjacent said ball keeper.

6. The joint of claim 5 wherein said spring retainer includes a spring acting between said wheel hub and said plug to urge said plug constantly toward said second end into engagement with said ball keeper.

7. The joint of claim 5 wherein said plug includes a seat spaced axially from said inner race toward said first end of said wheel hub, said ball keeper including a mating convex seat engaging said seat of said plug to support said ball keeper for articulated movement relative to said plug.

8. The joint of claim 5 wherein said plug defines a grease seal.

* * * * *